United States Patent [19]

Munday

[11] Patent Number: 4,653,782
[45] Date of Patent: Mar. 31, 1987

[54] PIPE REPAIR CLAMP

[75] Inventor: Keith Munday, London, England

[73] Assignee: British Gas Corporation, London, England

[21] Appl. No.: 825,901

[22] Filed: Feb. 4, 1986

[30] Foreign Application Priority Data

Feb. 18, 1985 [GB] United Kingdom ............... 8504083

[51] Int. Cl.⁴ .................................... F16L 21/06
[52] U.S. Cl. ...................................... 285/373; 285/15; 285/197
[58] Field of Search ................. 285/373, 197, 15; 138/99

[56] References Cited

U.S. PATENT DOCUMENTS 2,936,186  5/1960  Dunmire ................... 285/373
4,273,364  6/1981  de Lange ................... 285/197

FOREIGN PATENT DOCUMENTS 790109  2/1958  United Kingdom ........... 285/373

Primary Examiner—Richard J. Scanlan, Jr.
Attorney, Agent, or Firm—Oblon, Fisher, Spivak, McClelland & Maier

[57] ABSTRACT

A pipe repair clamp comprises a two-piece type split-collar, the collar being formed by joining the two pieces together about the surface of the pipe to be repaired. The pieces are shaped to form scarf-type joints and are provided with, affixed to their internal surfaces, portions of a gasket for sealing the surface of the pipe to be repaired from the external surface of the collar.

2 Claims, 2 Drawing Figures

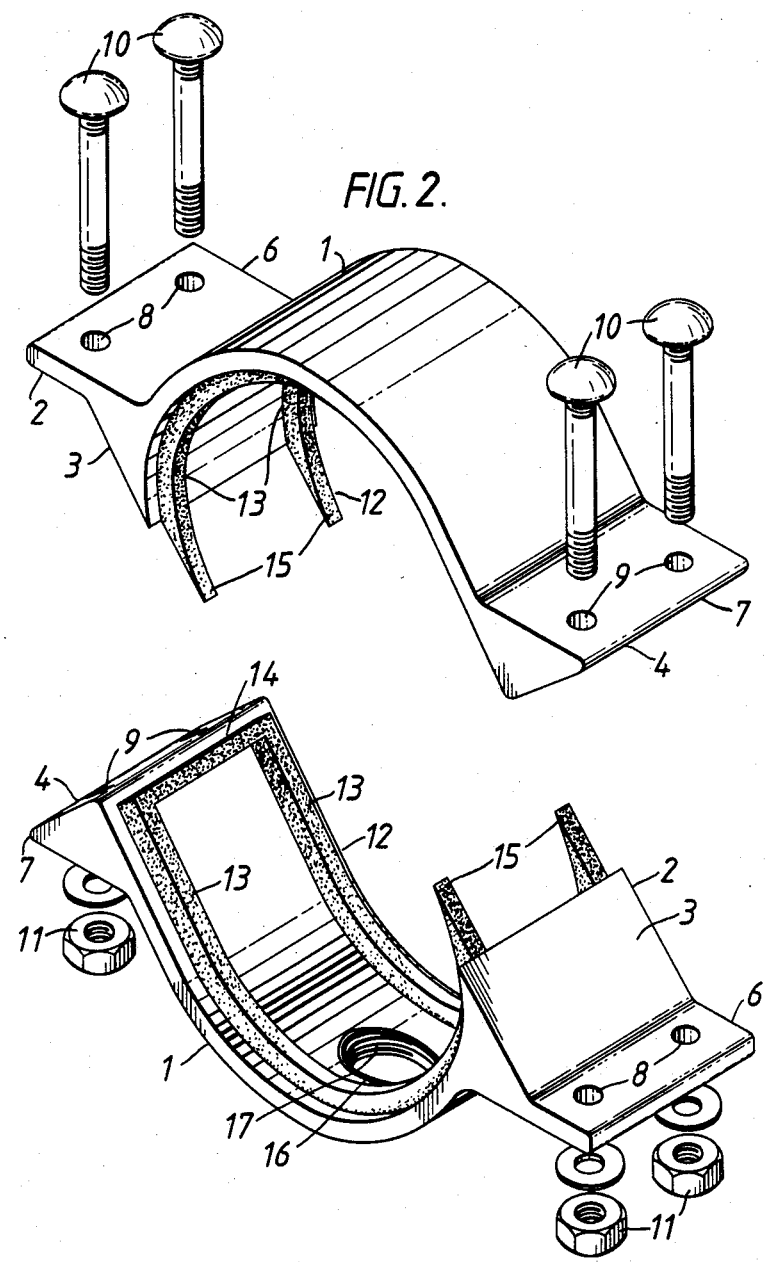

PIPE REPAIR CLAMP

BACKGROUND OF THE INVENTION

The present invention relates to a pipe repair clamp.

The present invention has for its object the provision of a pipe-repair clamp which is of a simplified construction compared to existing clamps yet being capable of use with pipes of slightly varying external diameters.

According to the present invention a pipe repair clamp comprises a two-piece type split-collar, the collar being formed by joining the two pieces together about the surface of the pipe to be repaired, the pieces being so shaped that at the joints the internal surface of one piece overlaps the external surface of the other piece and a gasket arranged within the collar to seal the surface of the pipe from the outside of the collar.

SUMMARY OF THE INVENTION

An embodiment of the invention will now be described by way of the example with reference to the accompanying drawings in which:

BRIEF DESCRIPTION OF THE DRAWINGS

FIG. 2 is an exploded isometric view of the two piece repair clamp in accordance with the present invention.

DETAILED DESCRIPTION OF THE PREFERRED EMBODIMENTS

Figure 1:
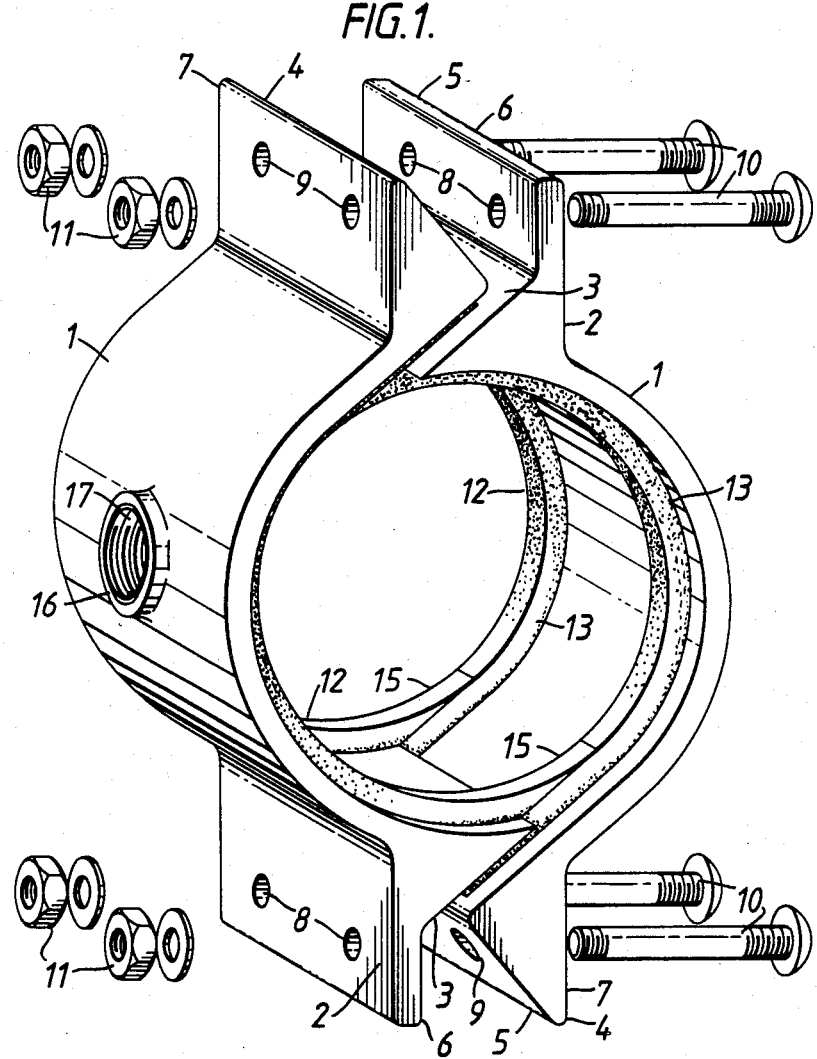
FIG. 1 is a view of the clamp as seen from the front and slightly to one side when the pieces are joined together.

Referring to the drawings the clamp comprises a two-piece type split collar having two identical pieces 1 of metal, for example steel, or of a rigid plastic material. Each piece 1 is generally part-circular in shape and is provided at one end 2 with a flat face 3 forming part of the external surface of the piece 1. The other end 4 of each piece 1 extends somewhat tangentially from the rest of the piece 1 and has an internal surface, in use, for overlapping the flat face 3 of the other piece 1 as shown in FIG. 1 whereby to form a scarf-type joint 5.

Each end 2 of each piece 1 is also formed with a lug 6 located between the face 3 and the rest of the piece 1.

The other end 4 of each piece 1 is also formed with a lug 7 and the lugs 6 and 7 each have a pair of corresponding apertures 8 and 9 so that the pieces 1 may be connected together by means of nut and bolt assemblies 10,11

The collar is provided with a gasket taking the form of two identical portions 12, each piece 1 being provided with a gasket portion 12 which is affixed in any convenient manner to the internal surface of the piece 1.

The gasket portions 12 comprise integral strips of resilient material such as synthetic rubber, each strip having a section 13 adjoining each circumferential edge of the piece 1 and a section 14 adjoining the end 4.

The sections 13 have ends 15 which extend slightly beyond the face 3 and are tapered so as to be overlapped by the sections 13 of an adjoining strip when the collar pieces 1 are clamped together as shown in FIG. 1.

When the collar pieces 1 are clamped together about the surface of a pipe, the gasket portions 12 form a sealed enclosure between the surface of the pipe and the internal surface of the pieces 1. That section of a gasket portion 10 attached to the tangential side 4 of each piece 1 will of course be clamped against the flat face end 3 of the other piece 1 so that escape of fluid through a joint 5 will be prevented.

One or both of the pieces 1 is provided with a boss 16 on its outer surface which is drilled and tapped to provide a tapped aperture 17 for connecting the collar piece 1 to an outlet pipe or tee. When not used for this purpose the aperture may be plugged and sealed. Where the piece is of plastics material the tapped aperture may be provided by a metal stub pipe insert held in an aperture in the piece. Alternatively the clamp may be supplied with the boss undrilled and untapped, drilling and tapping of the boss being carried out as and when required.

Because the collar pieces are connected together by scraf-joints, it will be possible to use the collar on pipes with slightly varying external diameters.

I claim:

1. A pipe clamp comprising:
   a two-piece split collar, said collar being formed by joining two pieces together about the surface of the pipe to be repaired, said pieces being so shaped that an internal surface of one piece overlaps an external surface of the other piece at joints between said two pieces, and
   a gasket arranged within the collar to seal the surface of the pipe from the outside of the collar,
   wherein each said collar piece has a portion of the gasket affixed to an internal surface thereof, wherein each said gasket portion is in the form of a strip having a part clampable in said overlap between said collar pieces at said joints, and wherein said gasket portions form a sealed enclosure between the surface of the pipe and said internal surfaces of said collar pieces.

2. A clamp as claimed in claim 1 wherein at least one said collar piece has an aperture for connecting said collar to a pipe or tee.

* * * * *